US010185571B2

(12) United States Patent
Warkentin et al.

(10) Patent No.: US 10,185,571 B2
(45) Date of Patent: Jan. 22, 2019

(54) INTELLIGENT UEFI RUN-TIME SERVICES ADDRESS SPACE MANAGEMENT

(71) Applicant: VMware, Inc., Palo Alto, CA (US)

(72) Inventors: Andrei Warkentin, Wakefield, MA (US); Timothy P. Mann, Palo Alto, CA (US); Alexander Fainkichen, Southborough, MA (US)

(73) Assignee: VMWARE, INC., Palo Alto, CA (US)

(*) Notice: Subject to any disclaimer, the term of this patent is extended or adjusted under 35 U.S.C. 154(b) by 47 days.

(21) Appl. No.: 15/618,010

(22) Filed: Jun. 8, 2017

(65) Prior Publication Data
US 2018/0357070 A1 Dec. 13, 2018

(51) Int. Cl.
*G06F 12/00* (2006.01)
*G06F 13/00* (2006.01)
*G06F 9/4401* (2018.01)
*G06F 12/109* (2016.01)
*G06F 11/22* (2006.01)
*G06F 11/27* (2006.01)
*G06F 9/455* (2018.01)

(52) U.S. Cl.
CPC ........ *G06F 9/4406* (2013.01); *G06F 9/45558* (2013.01); *G06F 11/2284* (2013.01); *G06F 11/27* (2013.01); *G06F 12/109* (2013.01); G06F 2009/45583 (2013.01); G06F 2212/657 (2013.01)

(58) Field of Classification Search
None
See application file for complete search history.

(56) References Cited

U.S. PATENT DOCUMENTS

| | | | | | |
|---|---|---|---|---|---|
| 5,822,582 | A | * | 10/1998 | Doragh | G06F 9/4408 713/2 |
| 6,012,142 | A | * | 1/2000 | Dokic | G06F 9/4405 713/2 |
| 2008/0005527 | A1 | * | 1/2008 | Bang | G06F 9/441 711/202 |
| 2009/0172340 | A1 | * | 7/2009 | Tang | G06F 12/0246 711/203 |
| 2017/0255567 | A1 | * | 9/2017 | Vidyadhara | G06F 12/1081 |
| 2017/0277530 | A1 | * | 9/2017 | Adams | G06F 8/65 |
| 2018/0253555 | A1 | * | 9/2018 | Schumacher | G06F 21/572 |

* cited by examiner

*Primary Examiner* — Sean D Rossiter
(74) *Attorney, Agent, or Firm* — Patterson & Sheridan, LLP

(57) ABSTRACT

A method of re-mapping memory regions for firmware run-time services to a virtual address space of a kernel executed on a processor, includes the steps of selecting a re-mapping policy for re-mapping the memory regions for the firmware run-time services, creating a new mapping according to the selected re-mapping policy, and making a call to an application programming interface exposed by the firmware to apply the new map and re-map the memory regions for the firmware to the virtual address space of the kernel.

20 Claims, 8 Drawing Sheets

INTELLIGENT UEFI RUN-TIME SERVICES ADDRESS SPACE MANAGEMENT

BACKGROUND

For nearly forty years, the Basic Input/Output System (BIOS) has been a standard type of firmware used to perform hardware initialization during the booting process (power-on startup) on personal computers (PCs). BIOS also provides run-time services for an operating system and programs after booting of the operating system. The fundamental purposes of the BIOS in PCs are to initialize and test the system hardware components, and to load a boot loader and subsequently an operating system from a mass memory device or network storage. The BIOS additionally provides an abstraction layer for the hardware until drivers are loaded. As such, variations in the system hardware are hidden by the BIOS from programs that use BIOS services instead of directly accessing the hardware.

Unified Extensible Firmware Interface (UEFI) has been developed as a successor to BIOS, aiming to address technical shortcomings of BIOS. Today, new PC hardware predominantly ships with UEFI. UEFI is applicable across a wide range of devices (servers, workstations, etc.) and central processing units (CPUs) (x64, ARM64, etc.). UEFI defines two types of services: boot services and run-time services. Boot services are available while the UEFI firmware owns the platform, and boot services include text and graphical console services on various devices, and bus, block and file services. UEFI has a resident portion—run-time services—which remain accessible while the operating system is running. Run-time services include services such as date, time, and non-volatile random access memory (NVRAM) access.

UEFI operates in 1:1 mapping mode, wherein virtual addresses are identically mapped to physical addresses. Operating system (OS) kernels typically use low virtual address spaces, typically the lowest 4 GB (to be compatible with legacy BIOS firmware), but low virtual addresses are frequently part of the user address space. As a result, run-time services needs to be re-mapped carefully to an unused portion of the kernel virtual address space.

Unfortunately, many UEFI firmware implementations have one or more limitations, because they may not fully comply with the UEFI specification. For example, many implementations of the firmware require both the new and the old mappings to the kernel virtual address space to exist during the run-time service re-mapping operation. In addition, although it would be preferable to map all time run-time services in the kernel virtual address space so as to consume the least amount of the virtual address space, some firmware implementations force relative offsets between run-time services memory regions to be maintained.

SUMMARY

One or more embodiments provide a method of re-mapping memory regions for firmware run-time services to a virtual address space of a kernel executed on a processor. The method includes the steps of selecting a re-mapping policy for re-mapping the memory regions for the firmware run-time services, creating a new mapping according to the selected re-mapping policy, and making a call to an application programming interface exposed by the firmware to apply the new map and re-map the memory regions for the firmware to the virtual address space of the kernel.

Further embodiments include, without limitation, a non-transitory computer-readable storage medium that includes instructions for a processor to carry out the above method, and a computer system that includes a processor programmed to carry out the above method.

DETAILED DESCRIPTION

Figure 1:
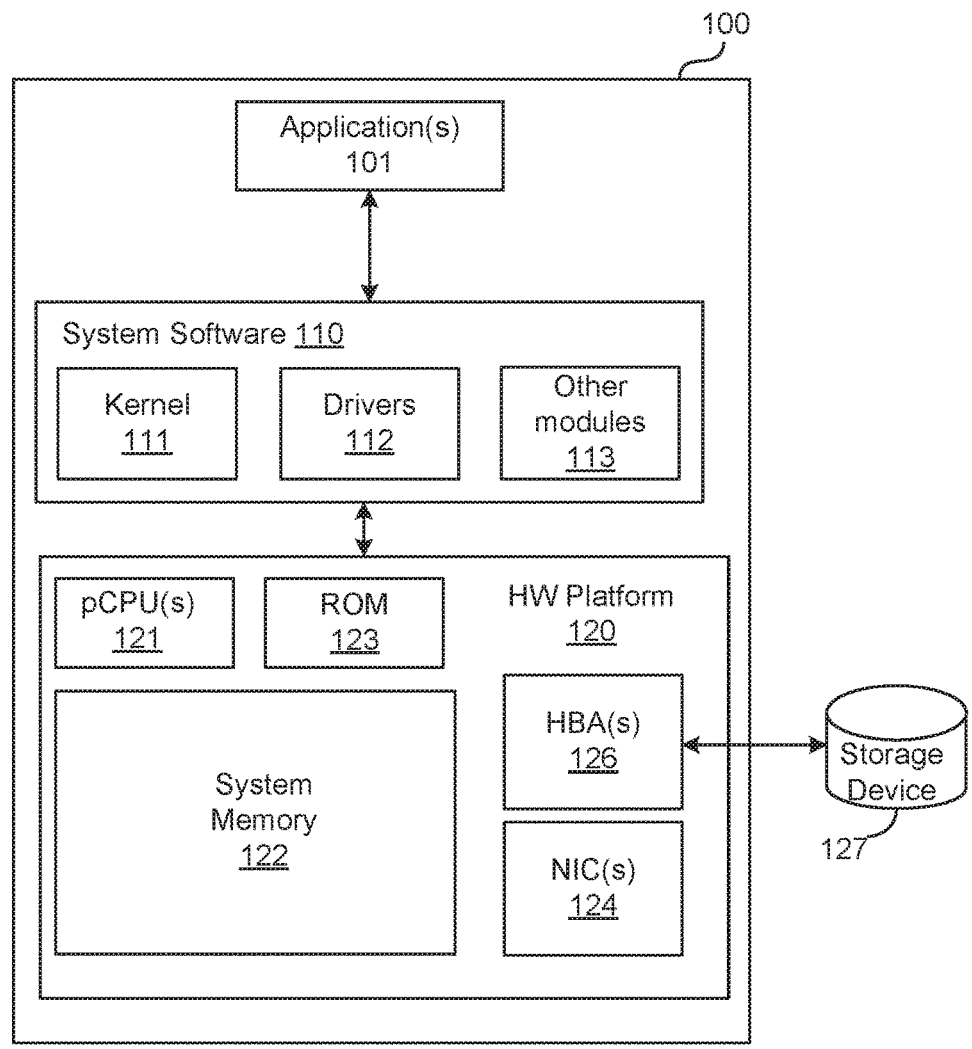
FIG. 1 is a block diagram of a computer system in which one or more embodiments may be implemented.

FIG. 1 is a block diagram of a computer system 100 in which one or more embodiments may be implemented. Computer system 100 includes one or more applications 101 that are running on top of system software 110. System software 110 includes a kernel 111, drivers 112 and other modules 113 that manage hardware resources provided by a hardware platform 120. In one embodiment, system software 110 is an operating system (OS), such as operating systems that are commercially available. In another embodiment, system software 110 is a hypervisor that supports virtual machine applications running thereon, e.g., a hypervisor that is included as a component of VMware's vSphere® product, which is commercially available from VMware, Inc. of Palo Alto, Calif. Hardware platform 120 includes one or more physical central processing units (pCPUs) 121, system memory 122 (e.g., dynamic random access memory (DRAM)), read-only-memory (ROM) 123, one or more network interface cards (NICs) 124 that connect computer system 100 to a network 130, and one or more host bus adapters (HBAs) 126 that connect to storage device(s) 127, which may be a local storage device or provided on a storage area network. In the descriptions that follow, pCPU denotes either a processor core, or a logical processor of a multi-threaded physical processor or processor core if multi-threading is enabled.

In the embodiments illustrated herein, computer system 100 is configured in accordance with the unified extensible firmware interface (UEFI) specification. In one embodiment, computer system 100 is booted from the storage device 127 in accordance with platform firmware stored in ROM 123. In another embodiment, computer system 100 is booted from the network in accordance with platform firmware stored in ROM 123.

Figure 2:
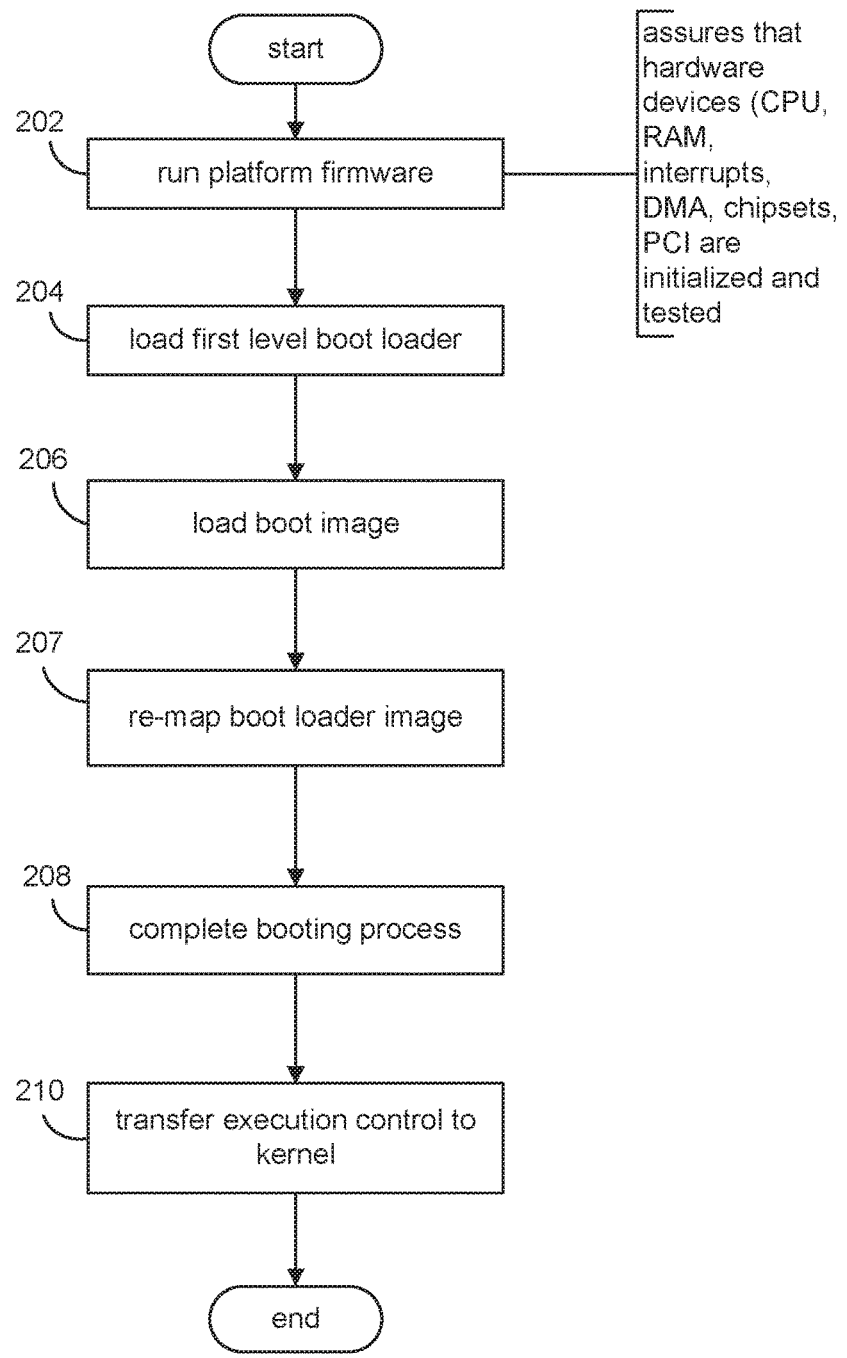
FIG. 2 is a flow diagram of a process for booting a computer system according to one or more embodiments.
Figure 3:
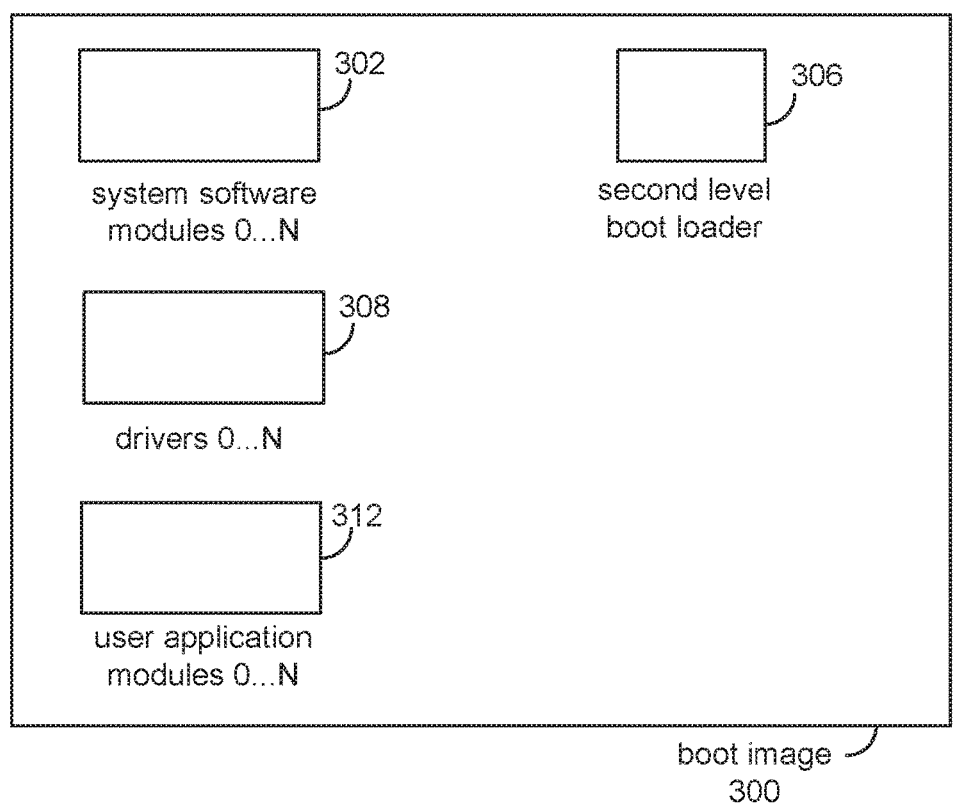
FIG. 3 depicts an example set of modules included in a boot image that is loaded into system memory during a boot process.

During booting, the platform firmware carries out the functions of initializing and testing the various hardware devices, RAM, interrupts, DMA, chipsets, and PCI devices and controllers for correct operation. The boot process according to an embodiment involves the steps depicted in FIG. 2. In step 202, the platform firmware is executed on one of pCPUs 121 designated as the boot processor. The platform firmware provides two types of services—boot services and run-time services—code and data for which are loaded into system memory 122 and identically mapped to the virtual address space of the platform firmware. One of the boot services is power-on self-test (POST), which is carried out at step 202 to confirm that all of the hardware devices are in working order and properly initialized. In step 204, the platform firmware determines the location of a first level boot loader and loads the first level boot loader into system memory 122. In step 206, the platform firmware hands off execution control to the first level boot loader. The job of the first level boot loader is to load into system memory 122 all of the modules contained in a boot image (e.g., boot image 300 depicted in FIG. 3, also referred to herein as the "boot-time modules"). The boot-time modules to be loaded into system memory 122 include a second level boot module 306, which includes the second level boot loader, system software modules 302, which include kernel 111, driver modules 308, which include drivers 112, and user application modules 312.

Upon loading kernel 111 into system memory 122, the first level boot loader, in step 207, performs re-mapping of the run-time services into the virtual address space of kernel 111. In one embodiment, the re-mapping is performed by making a runtime call exposed by the platform firmware as "SetVirtualAddressMap" (which is an API call defined in the UEFI specification). This call takes as an input a new memory map for the run-time services, according to which the virtual address space for the run-time memory regions is updated (from being identically mapped) to an address space within the virtual address space of kernel 111 (e.g., one of the examples illustrated in FIGS. 4A-4D). In response, the platform firmware internally updates all necessary pointers and global data to account for the new translation.

In step 208, execution control is transferred to the second level boot loader. The job of the second level boot loader is to complete the booting process and then transfer execution control to kernel 111 in step 210.

FIGS. 4A-4D depict different examples of re-mapping run-time services memory regions into the kernel virtual address space. The address space on the left hand side represents the physical address space occupied by components of run-time services, including run-time code, run-time data, and run-time memory-mapped input/output (MMIO), and the address space on the right hand side represents the virtual address space of kernel 111 to which the run-time services memory regions are to be re-mapped.

Figure 4A:
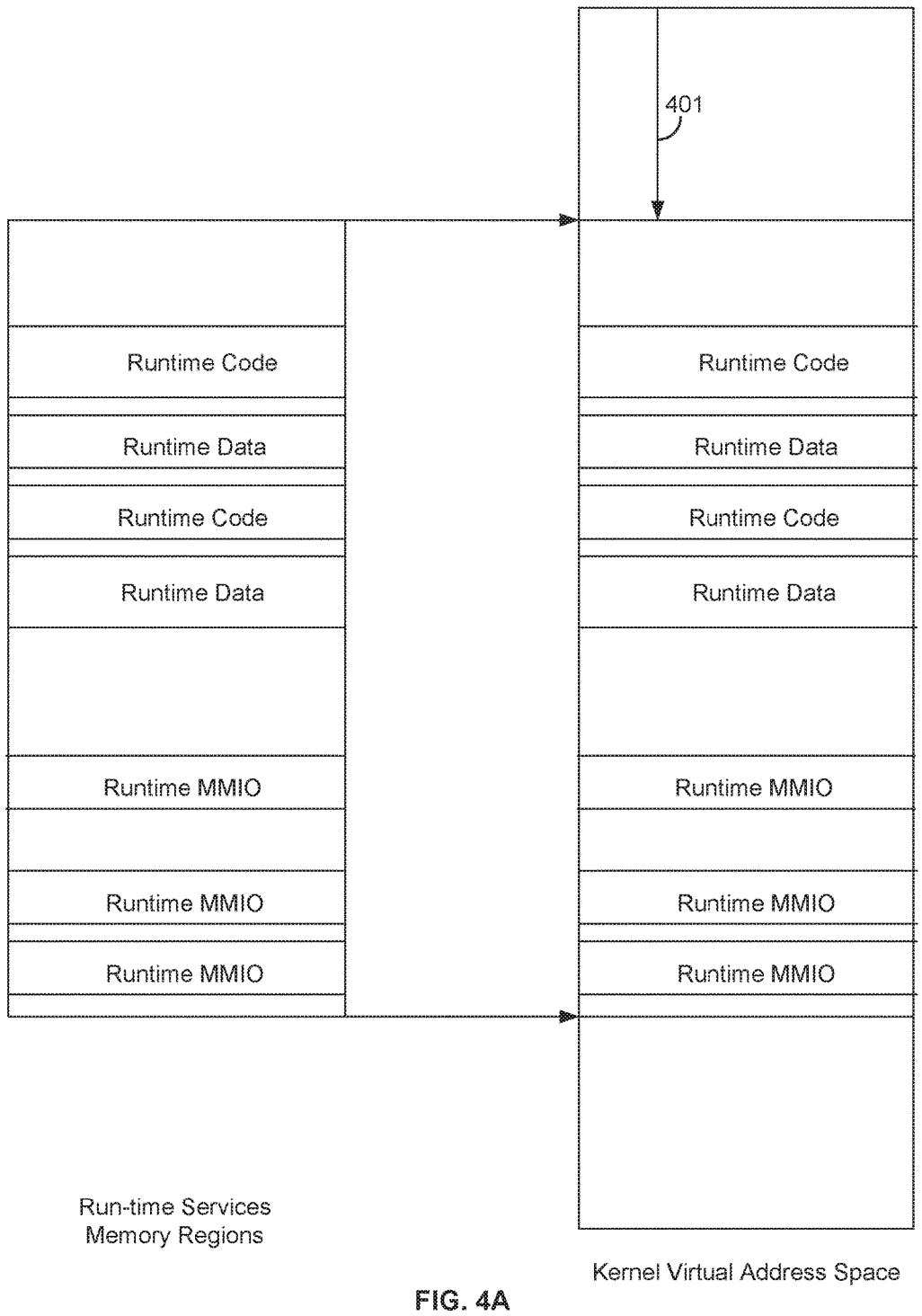
FIGS. 4A-4D depict different examples of re-mapping run-time services memory regions into an OS-provided virtual address space.

The example of FIG. 4A illustrates a "simple" re-mapping policy. When carrying out this policy, the first level boot loader through the SetVirtualAddressMap call re-maps run-time services memory regions into its virtual address space by a fixed offset 401 from the beginning of its virtual address space, while maintaining a relative offset between mappings of one or more memory regions of run-time code, run-time data, and run-time MMIO. The simple re-mapping policy is generally the preferred policy for x86 processors, due to firmware implementation bugs.

Figure 4B:
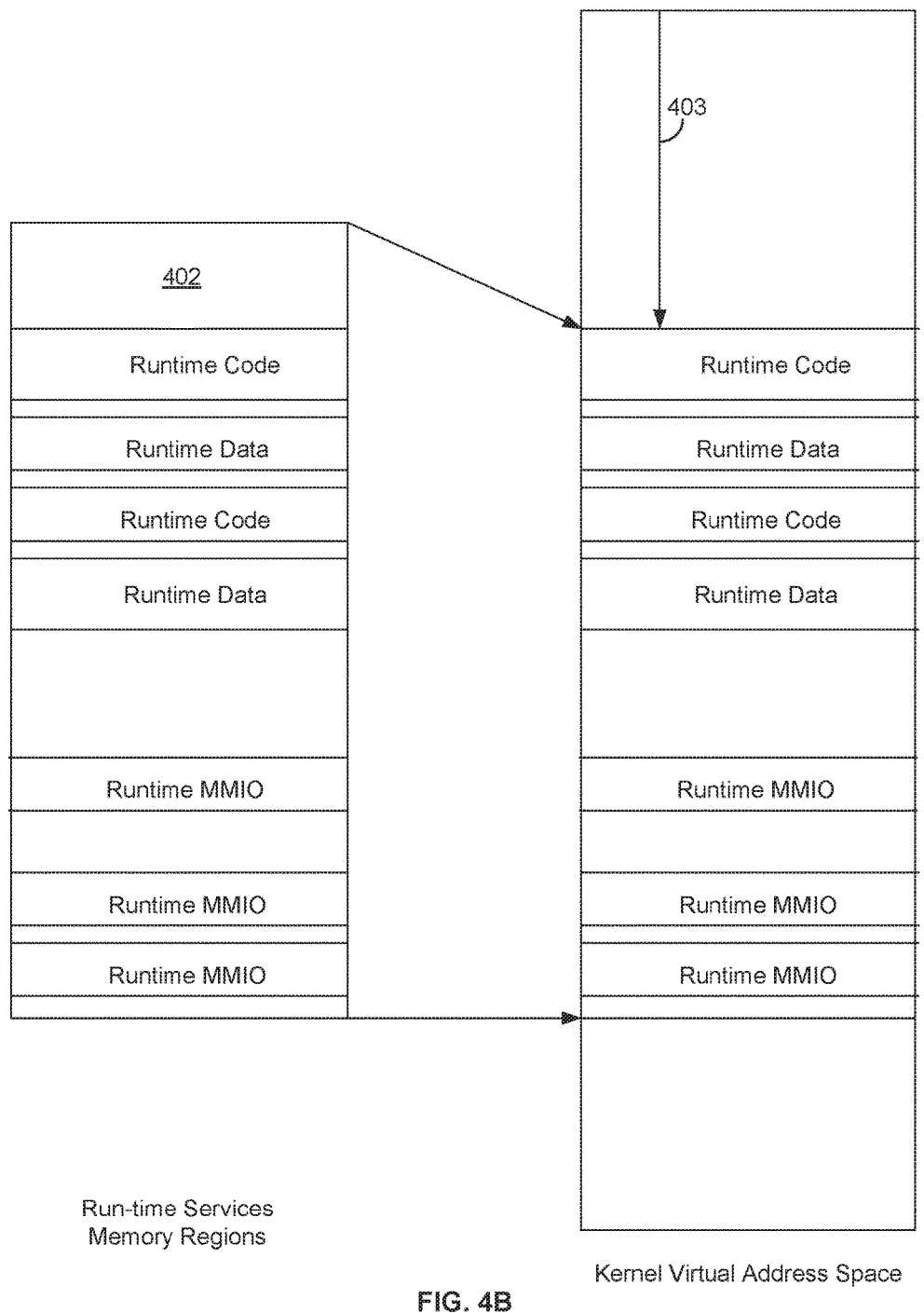

The example of FIG. 4B illustrates a "sparse" re-mapping policy. When carrying out this policy, the first level boot loader through the SetVirtualAddressMap call re-maps run-time services memory regions into its virtual address space as according to the simple re-mapping policy but eliminates a hole 402 before the start of the first data-containing region of the run-time services memory region. As such, a fixed offset 403 from the beginning of the kernel virtual address space to the beginning of the virtual address space of the run-time services in the kernel virtual address space is greater than fixed offset 401. The sparse re-mapping policy is generally preferable to the simple re-mapping policy because the run-time services memory regions are more compactly mapped in the kernel virtual address space.

Figure 4C:
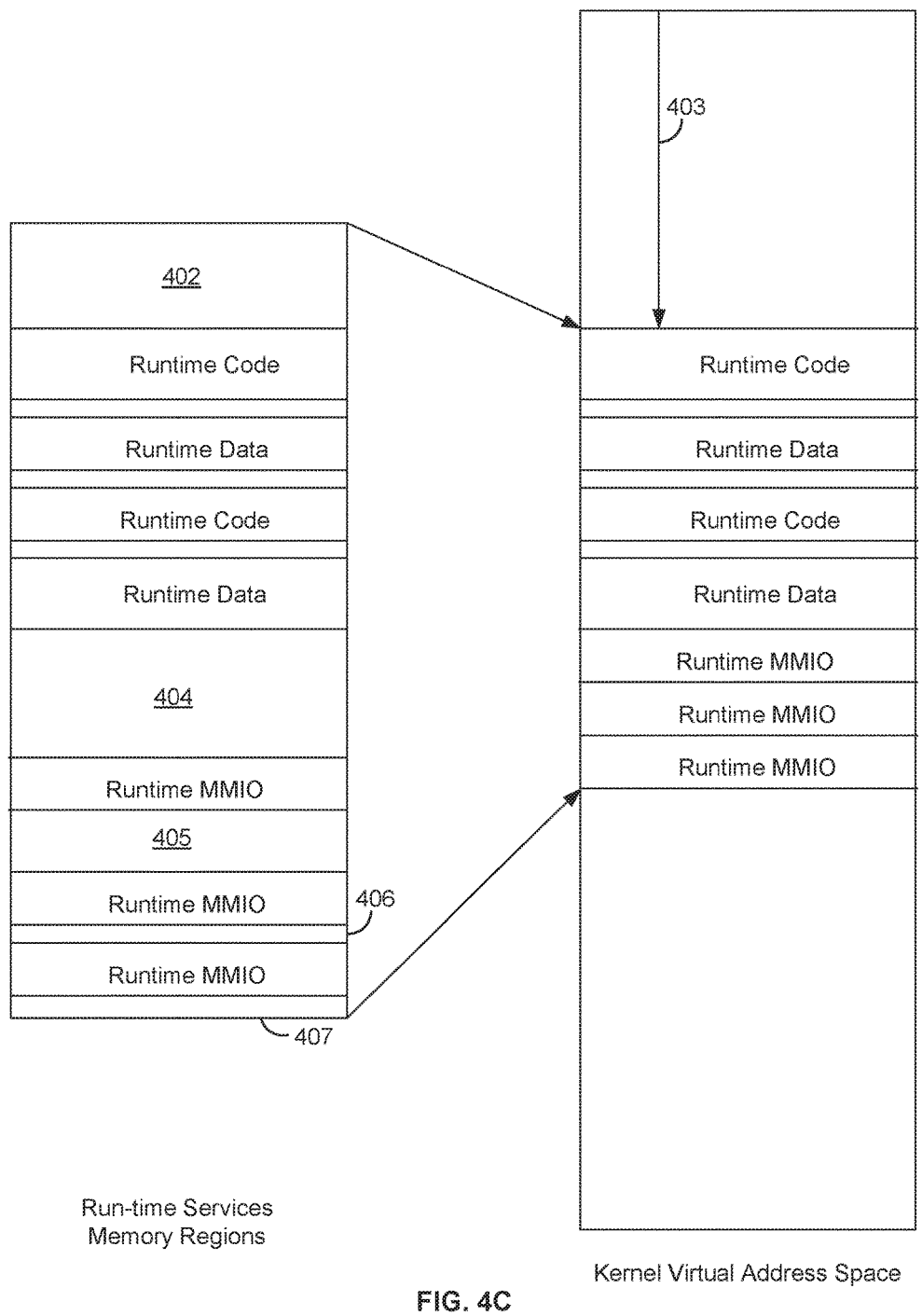

The example of FIG. 4C illustrates a "compact" re-mapping policy. When carrying out this policy, the first level boot loader through the SetVirtualAddressMap call re-maps run-time services memory regions into its virtual address space as according to the sparse re-mapping policy, and further compacts the virtual address space of the run-time services in the kernel virtual address space by only keeping holes between run-time code memory regions and run-time data memory regions. The other holes, e.g., holes 404, 405, 406, and 407 are eliminated.

Figure 4D:
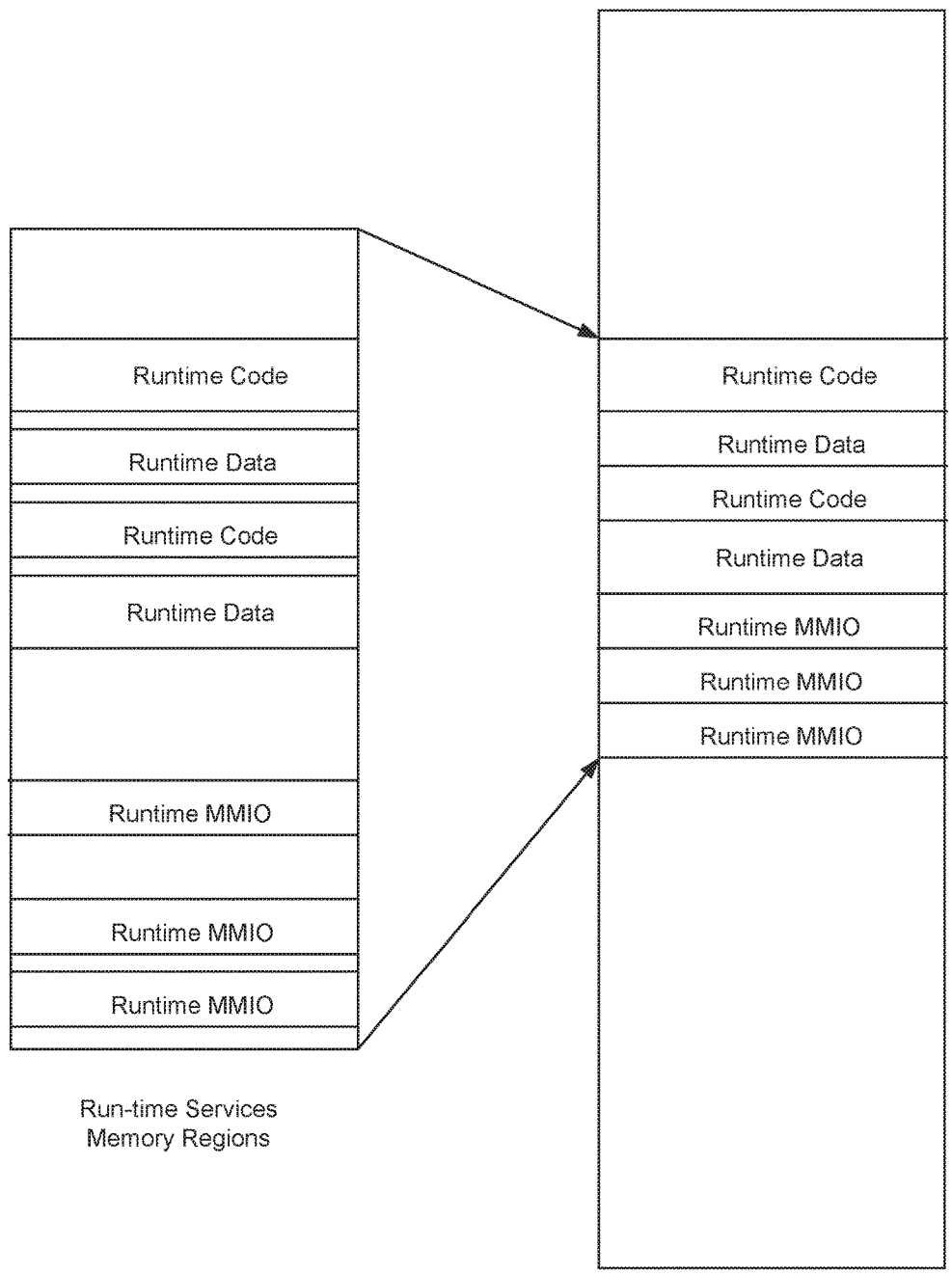

The example of FIG. 4D illustrates a "contiguous" re-mapping policy. When carrying out this policy, the first level boot loader through the SetVirtualAddressMap call re-maps the run-time services memory regions into one contiguous virtual address space within the kernel virtual address space.

Figure 5:
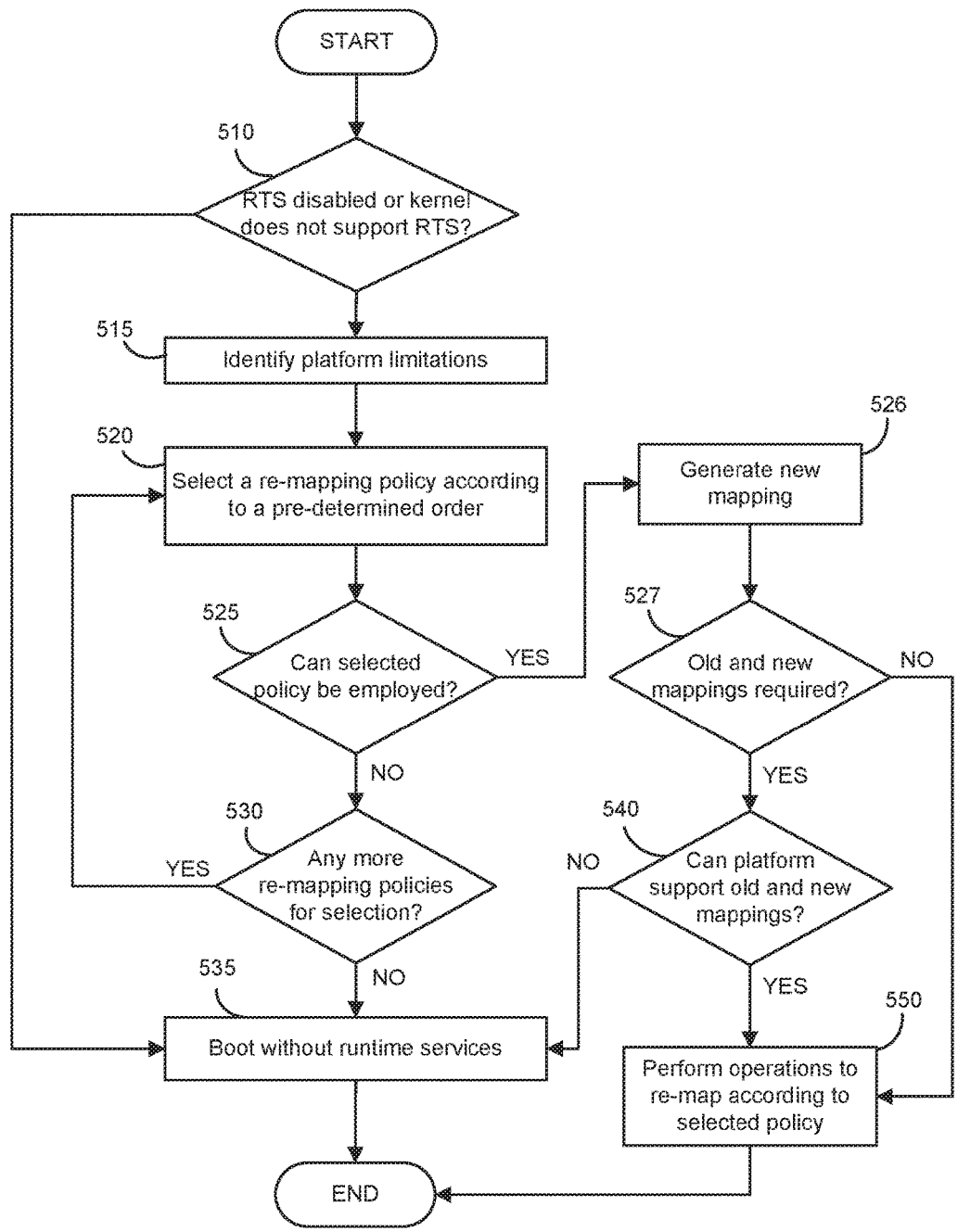
FIG. 5 depicts a flow diagram of a method for re-mapping run-time services memory regions into a kernel virtual address space, according to one or more embodiments.

FIG. 5 is a flow diagram of a method for re-mapping run-time services memory regions into a kernel virtual address space, according to one or more embodiments. The steps of this method are carried out by the first level boot loader in step 207 of FIG. 2.

In FIG. 510, the first level boot loader determines if run-time services (RTS) has been disabled in kernel 111 or if kernel 111 does not support run-time services. If so, the flow jumps to step 535, where the first level boot loader completes the booting process without run-time services.

If, on the other hand, the first level boot loader determines that run-time services has not been disabled in kernel 111 and that kernel 111 supports run-time services, the flow proceeds to step 515. In step 515, the first level boot loader identifies certain pre-defined platform limitations. For example, some platforms require that both the new and old mappings exist across the SetVirtualAddressMap call. In one embodiment, this requirement is indicated in a look-up table that contains separate entries for each motherboard vendor, SKU, firmware revision, etc. In addition, each entry for motherboard vendor, SKU, firmware revision, etc. in the look-up table indicates for each of the four policies described above in conjunction with FIGS. 4A-4D, whether or not the policy is permitted to be used.

In step 520, the first level boot loader selects one of the four policies, described in conjunction with FIGS. 4A-4D, for re-mapping the run-time services memory regions into the kernel virtual address space, according to a pre-determined order. The pre-determined order is set based on safety and likelihood of not triggering a bug in the firmware when the re-mapping is performed. One example of the pre-determined order is the simple policy, then the sparse policy, then the compact policy, and then the contiguous policy.

After the policy is selected in step 520, the first level boot loader, in step 525, determines if the run-time services memory regions can be re-mapped into the kernel virtual address space. First, the first level boot loader examines the look-up table to see if the selected policy is permitted to be used in the platform. Second, the first level boot loader determines if there is sufficient contiguous space within the kernel virtual address space to fit the address space of the run-time services memory regions upon re-mapping according to the selected policy. If either of these conditions is not satisfied, the first level boot loader executes the decision block of step 530 to determine if there is another policy for selection. If there is, the flow returns to step 520, where the first level boot loader selects another policy and executes the subsequent steps as described above. If there is no more policy for selection, the first level boot loader completes the booting process without run-time services in step 535.

If both conditions of step 525 are satisfied, the first level boot loader generates a memory map with new RTS mappings in step 526, and then determines in step 527 if the platform requires both old and new mappings of the run-time services memory regions for the safe and correct operation of the SetVirtualAddressMap call. If so, the first level boot loader in step 540 checks to see if both mappings can be supported by the platform by inspecting existing mappings in the virtual address space of the firmware. Both mappings can be supported if there is no overlap between the new RTS mappings and existing mappings in the address space of the firmware. If both mappings can be supported by the platform, the first level boot loader in step 550 updates the page tables for the firmware address space to reflect the new mappings and makes the SetVirtualAddressMap call to apply the new mappings to re-map the address space of the run-time services according to the selected policy into the kernel virtual address space while retaining the old mappings. Thereafter, the new mappings are cleaned up and the re-mapping process terminates.

Returning to step 527, if the platform does not require both old and new mappings of the run-time services memory regions, the first level boot loader in step 550 makes the SetVirtualAddressMap call to apply the new mappings to re-map the address space of the run-time services according to the selected policy into the kernel virtual address space. Thereafter, the re-mapping process terminates.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of re-mapping memory regions for firmware run-time services to a virtual address space of a kernel executed on a processor, comprising:
    selecting a re-mapping policy for re-mapping the memory regions for the firmware run-time services;
    creating a new mapping according to the selected re-mapping policy; and
    making a call to an application programming interface exposed by the firmware to apply the new mapping and re-map the memory regions for the firmware to the virtual address space of the kernel.

2. The method of claim 1, wherein the firmware operates in accordance with the Unified Extensible Firmware Interface (UEFI) specification.

3. The method of claim 1, wherein the re-mapping policy is selected from one of a plurality of re-mapping policies.

4. The method of claim 3, wherein the selected re-mapping policy is a simple re-mapping policy according to which the run-time services memory regions are re-mapped into the virtual address space of the kernel by a fixed offset from the beginning of its virtual address space, while maintaining relative offsets between mappings of the run-time services memory regions.

5. The method of claim 3, wherein the selected re-mapping policy is a sparse re-mapping policy according to which the run-time services memory regions are re-mapped into the virtual address space of the kernel by a fixed offset from the beginning of its virtual address space, while maintaining relative offsets between mappings of the run-time services memory regions, wherein the fixed offset is increased so as to eliminate any empty memory region at the beginning of the run-time services memory regions.

6. The method of claim 3, wherein the selected re-mapping policy is a compact re-mapping policy according to which the run-time services memory regions are re-mapped into the virtual address space of the kernel by a fixed offset from the beginning of its virtual address space, while maintaining relative offsets between mappings of some adjacent pairs of the run-time services memory regions, wherein the fixed offset is increased so as to eliminate any empty memory region at the beginning of the run-time services memory regions and relative offsets between other adjacent pairs of the run-time services memory regions are eliminated.

7. The method of claim 3, wherein the selected re-mapping policy is a contiguous re-mapping policy according to which the run-time services memory regions are re-mapped into one contiguous virtual address space within the kernel virtual address space.

8. The method of claim 3, wherein the plurality of re-mapping policies is evaluated in order until one of the re-mapping policies is selected.

9. The method of claim 8, wherein one of the re-mapping policies is selected if there is sufficient space in the virtual address space of the kernel to accommodate the new mapping that is created according to the selected re-mapping policy.

10. The method of claim 8, wherein a special technique of invoking the firmware application programming interface to apply the selected re-mapping policy with both sets of mappings present is used, if new kernel mappings created according to the selected re-mapping policy do not conflict with existing mappings of the virtual address space of the firmware.

11. A non-transitory computer readable medium comprising instructions for causing a processor to perform a method of re-mapping memory regions for firmware run-time services to a virtual address space of a kernel executed on the processor, wherein the method comprises:
    selecting a re-mapping policy for re-mapping the memory regions for the firmware run-time services;
    creating a new mapping according to the selected re-mapping policy; and
    making a call to an application programming interface exposed by the firmware to apply the new map and re-map the memory regions for the firmware to the virtual address space of the kernel.

12. The non-transitory computer readable medium of claim 11, wherein the firmware operates in accordance with the Unified Extensible Firmware Interface (UEFI) specification.

13. The non-transitory computer readable medium of claim 11, wherein the re-mapping policy is selected from one of a plurality of re-mapping policies.

14. The non-transitory computer readable medium of claim 13, wherein the plurality of re-mapping policies is evaluated in order until one of the re-mapping policies is selected.

15. The non-transitory computer readable medium of claim 14, wherein one of the re-mapping policies is selected if there is sufficient space in the virtual address space of the kernel to accommodate the new mapping that is created according to the selected re-mapping policy.

16. A computer system, comprising:
    a system memory which includes memory regions for firmware run-time services; and
    a processor configured to re-map the memory regions for the firmware run-time services to a virtual address space of a kernel executed thereon by carrying out the steps of
        selecting a re-mapping policy for re-mapping the memory regions for the firmware run-time services,
        creating a new mapping according to the selected re-mapping policy, and
        making a call to an application programming interface exposed by the firmware to apply the new map and re-map the memory regions for the firmware to the virtual address space of the kernel.

17. The system of claim 16, wherein the firmware operates in accordance with the Unified Extensible Firmware Interface (UEFI) specification.

18. The system of claim 16, wherein the re-mapping policy is selected from one of a plurality of re-mapping policies.

19. The system of claim 18, wherein the plurality of re-mapping policies is evaluated in order until one of the re-mapping policies is selected.

20. The system of claim 19, wherein one of the re-mapping policies is selected if there is sufficient space in the virtual address space of the kernel to accommodate the new mapping that is created according to the selected re-mapping policy.

<p style="text-align:center">* * * * *</p>